(12) United States Patent
Enns et al.

(10) Patent No.: US 7,013,350 B2
(45) Date of Patent: Mar. 14, 2006

(54) SYSTEM SETTING FLAGS BASED ON ADDRESS TYPES IN DESTINATION ADDRESS FIELD OF A MESSAGE TO INDICATE DIFFERENT TRANSPORTS TO DELIVER THE MESSAGE

(75) Inventors: Neil R. N. Enns, Redmond, WA (US); Gregory M. Burgess, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 853 days.

(21) Appl. No.: 09/788,225

(22) Filed: Feb. 16, 2001

(65) Prior Publication Data

US 2002/0116499 A1 Aug. 22, 2002

(51) Int. Cl.
*G06F 15/16* (2006.01)

(52) U.S. Cl. .................................. 709/245; 709/238
(58) Field of Classification Search ................ 709/206, 709/245, 238; 717/100; 379/207.15, 229; 707/10; 455/414.3; 370/356; 340/7.2; 715/500
See application file for complete search history.

(56) References Cited

U.S. PATENT DOCUMENTS

| | | | | |
|---|---|---|---|---|
| 6,073,142 | A * | 6/2000 | Geiger et al. ................ | 715/500 |
| 6,185,603 | B1 * | 2/2001 | Henderson et al. .......... | 709/206 |
| 6,249,668 | B1 * | 6/2001 | Abe et al. .................... | 340/7.2 |
| 6,256,771 | B1 * | 7/2001 | O'Neill ....................... | 717/100 |
| 6,370,566 | B1 * | 4/2002 | Discolo et al. .............. | 709/206 |
| 6,430,177 | B1 * | 8/2002 | Luzeski et al. .............. | 370/356 |
| 6,560,327 | B1 * | 5/2003 | McConnell ................... | 379/229 |
| 6,584,466 | B1 * | 6/2003 | Serbinis et al. ............... | 707/10 |
| 6,650,891 | B1 * | 11/2003 | Wierzbitzki et al. ..... | 455/414.3 |
| 2003/0018720 | A1 * | 1/2003 | Chang et al. ................ | 709/206 |
| 2003/0147518 | A1 * | 8/2003 | Albal et al. ............. | 379/207.15 |

OTHER PUBLICATIONS

LaPorta et al., "Experiences with network-based user agents for mobile applications," *Mobile Networks and Applications 3*, 1998, pp. 123-141.

(Continued)

*Primary Examiner*—Le Hien Luu
(74) *Attorney, Agent, or Firm*—Merchant & Gould; Ryan T. Grace (57) ABSTRACT

A method and system for sending a message to multiple recipients using multiple transports from the same user interface is provided. The method allows a user to specify recipients and associated transports explicitly or implicitly. The user may explicitly associate a transport with a recipient by selecting the recipient's address from a contact list. The user may implicitly associate a transport with a recipient by entering the literal address of the recipient, such as an email address or a wireless address. When the user enters one or more literal addresses, the system parses the one or more addresses to determine which transport should deliver the message to each address, respectively. As it parses the addresses and makes its determinations, it sets flags appropriately. Then, each transport uses the flags to determine if it has a message to deliver, and if so, delivers the message. The transport that delivers the message last may perform or cause additional processing on the message such as moving to a sent box, deleting it, or performing other actions.

18 Claims, 7 Drawing Sheets

OTHER PUBLICATIONS

Mazières et al., "The Design, Implementation and Operation of an Email Pseudonym Server," *Proc. of the 5th ACM Conference on Computer and Communications Security,* 1998, pp. 27-36.

Agrawal et al., "Mobile Computing in Next Generation Wireless Networks," *Proc. of the 3rd Int'l. Workshop on Discrete Algorithms and Methods for Mobile Computing and Communications,* 1999, pp. 32-39.

Hodes et al., "Composable ad hoc location-based services for heterogeneous mobile clients," *Wireless Networks 5:5,* 1999, pp. 411-427.

* cited by examiner

SYSTEM SETTING FLAGS BASED ON ADDRESS TYPES IN DESTINATION ADDRESS FIELD OF A MESSAGE TO INDICATE DIFFERENT TRANSPORTS TO DELIVER THE MESSAGE

FIELD OF THE INVENTION

The present invention relates generally to computer-executable software, and more particularly to sending a message using multiple transports.

BACKGROUND

As processors have become smaller, they have proliferated and spread. Consumer electronics of almost any size now include controllers or processors and perform many functions that used to be the domain of desktop computers. One such device, the cellular phone, once dedicated to transmitting voice communication is now being used to transmit in addition to voice communication a variety of other data. Some cellular phones allow users to connect to the Internet and browse web sites; other cellular phones allow users to check and send email.

In this increasingly connected world, options for sending messages are also increasing. Some people may be reached through paging, voice mail, email, and other wireless communication devices; others prefer providing only an email address. Some people are on-call 24 hours a day; others prefer to receive messages from 9 to 5. With all the communication options available, it is becoming more of a challenge to send a message through the appropriate transport when multiple recipients are involved. For example, a user may be required to use one system to send the message to recipients through a pager transport, another system to send the message to recipients through a voice mail transport, and yet another system to deliver the message to recipients through an email transport. Alternatively, a user may use one device to send the message to pager, voice mail, and email recipients but may be required to manually group recipients of each type together and use different options on the device to send the message to each group through the appropriate transport.

SUMMARY

The present invention provides a method and system for sending a message to multiple recipients using multiple transports from the same user interface. The invention provides a common interface for addressing a message to an email recipient and/or a wireless communication recipient, such as a cellular phone or pager user. Furthermore, the invention provides a method for determining if the message should be transmitted through multiple transports and if so, indicating to the multiple transports that the message is ready to be transmitted.

In one aspect of the invention, the user is provided a form for sending messages. The user may select recipient(s) address(es) using a contact list, or the user may directly enter the address. Using the address entered and/or contact information, the appropriate transport is selected. For example, the user might enter an address of JaneDoe@microsoft.com (email address) or +14252332333 (SMS address). Based on the format of the data entered, the invention determines the appropriate transport(s) and flags the message accordingly.

In another aspect of the invention, each transport uses the flags to determine if it should deliver the message to one or more recipients. When a transport determines that it should deliver the message, it does so and marks that the message has been delivered by clearing its respective flag. When all the flags associated with the message have been cleared, the message may be moved to another folder, such as a sent items or a deleted items folder, or appropriately processed.

The invention simplifies sending messages. Instead of requiring a user to use one device to send the message to email recipients and another device to send the message to wireless recipients, or alternatively one form or submenu to send the message to email recipients and another form or submenu to send the message to wireless recipients, the user may use one device and one form to send the message to recipients using multiple transports.

DETAILED DESCRIPTION

The present invention provides a method and system for sending a message to recipients using one or more transports. Among other things, disclosed is a method for determining which transport should transmit a message to a recipient and for flagging the message appropriately. Also disclosed is a method a transport may employ to use the flagged messages to determine if the transport has a message to deliver and if the transport is the last transport delivering the message. When the latter condition occurs, the transport may move the message to another folder, such as a sent items or a deleted items folder, or take other appropriate action. First, an illustrative operating environment, computing device, and mobile device will be described. Then an illustrative message delivery system will be discussed together with a method the message delivery system may use to deliver messages recipients using multiple transports.

Illustrative Operating Environment

Figure 1:
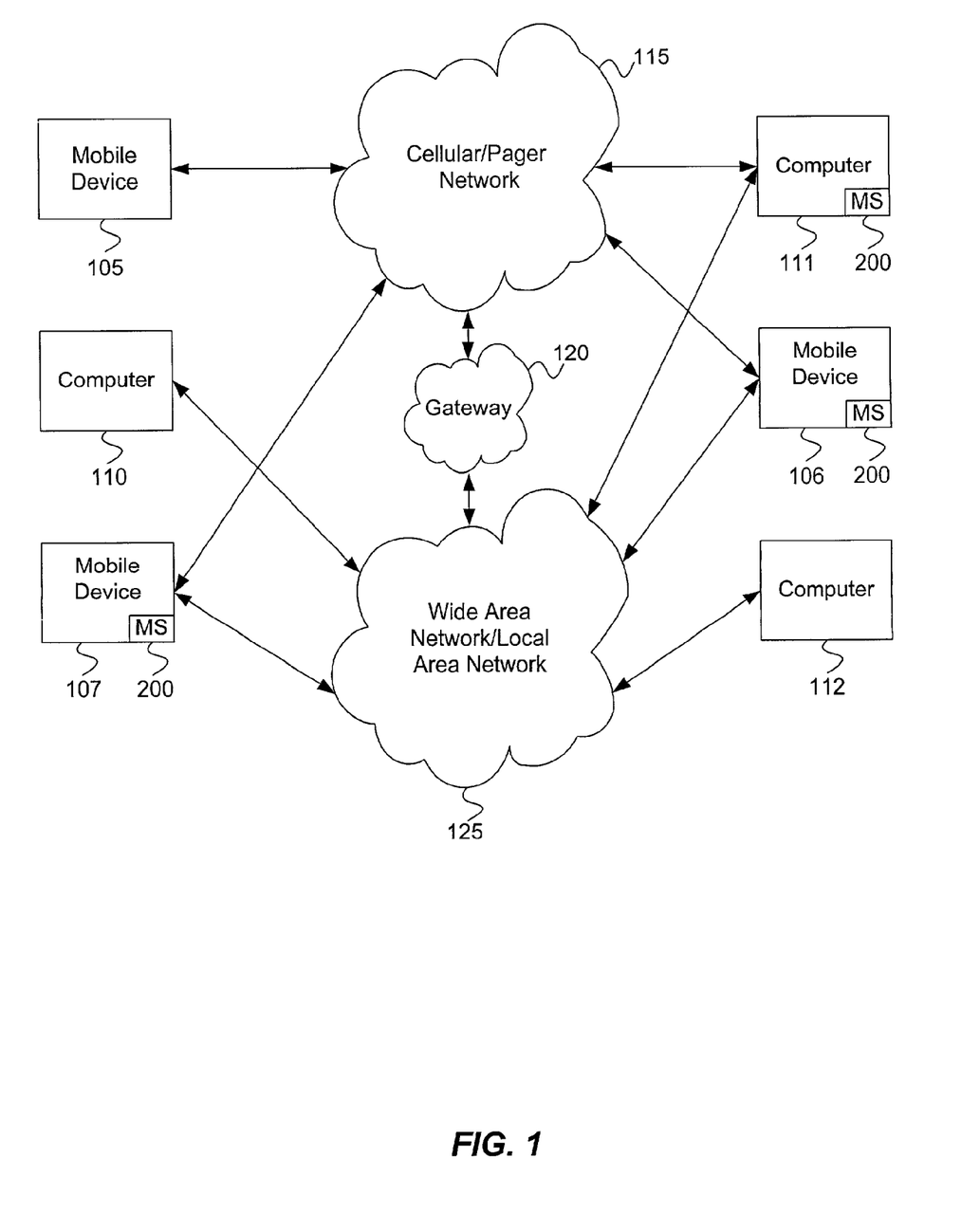
FIG. 1 is a functional block diagram showing an exemplary system in which the invention operates.

With reference to FIG. 1, an exemplary system in which the invention operates includes mobile devices 105–107, computers 110–112, cellular/pager network 115, gateway 120, and wide area network (WAN)/local area network (LAN) 125. Mobile devices 105–107 and computer 111 include messaging system 200 which is described in more detail in conjunction with FIG. 2.

Mobile devices 105–107 are connected to cellular/pager network 115. Mobile devices 106 and 107 may also be connected directly to WAN/LAN 125. For example, mobile devices 106 and 107 may have a network interface that allows them to plug directly into WAN/LAN 125. Mobile devices 106 and 107 may have a radio frequency (RF) connection in communication with a router or gateway that is part of WAN/LAN 125. Alternatively, mobile devices 106 and 107 may send all communications to WAN/LAN 125 through cellular/pager network 115, addressing the messages such that they travel across gateway 120.

Computers 110–112 are connected to WAN/LAN 125, while computer 111 is also connected directly to cellular/pager network 115. Computer 111 may have a cellular/pager communication device which allows it to send messages directly to cellular/pager network 115 (instead of routing such messages through gateway 120). Alternatively, computer 111 may send all communications to cellular/page network 115 through WAN/LAN 125, addressing the messages such that they travel across gateway 120.

Figure 6:
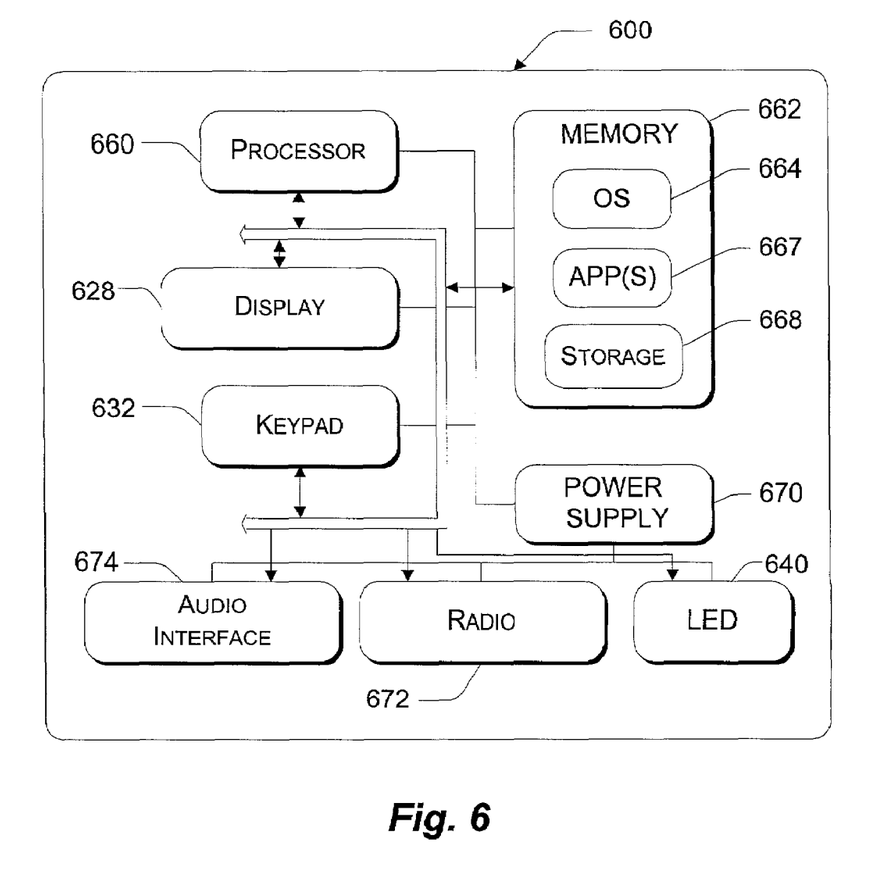
FIG. 6 is a functional block diagram illustrating functional components of a mobile computing device 600.

Generally, mobile devices 105–107 are any movable devices capable of executing software and sending information to or receiving information from cellular and/or pager networks and/or a WAN/LAN. Such devices include personal computers, hand-held devices, multiprocessor systems, microprocessor-based or programmable consumer electronics, network PCs, wearable computers, and the like. Hand-held devices include cellular phones, smart phones, pagers, POCKET PCs, personal digital assistants (PDAs), integrated devices combining one or more of the preceding devices, and the like. An exemplary mobile device is shown in FIG. 6 and described in conjunction therewith.

Figure 7:
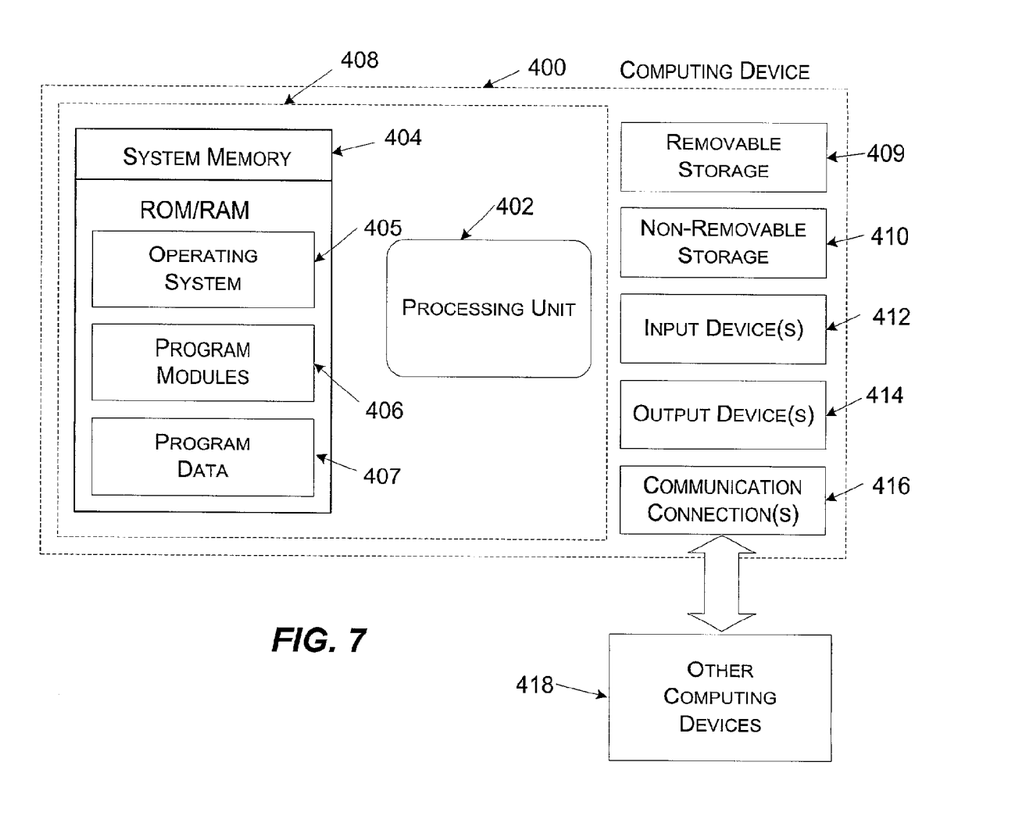
FIG. 7 is a functional block diagram illustrating an exemplary system for implementing the invention in accordance with the invention.

Generally, computers 110–112 are any devices capable of sending information to and receiving information from a WAN/LAN. Typically, computers 110–112 include less movable computing devices such as minicomputers, mainframes, and the like in addition to the devices described in conjunction with mobile devices 105–107. An example of a computer is shown in FIG. 7 and described in conjunction therewith.

Cellular/pager network 115 is a network delivering messages to and receiving messages from devices capable of wireless communication. Cellular/pager network 115 may include both wireless and wired components. For example, cellular/pager network may include a cellular tower that is linked to a wired telephone network. Typically, the cellular tower carries communication to and from cell phones and pagers, and the wired telephone network carries communication to regular phones, long-distance communication links, and the like. One example of a messaging service that would use cellular/pager network 115 is the Simple Messaging Service (SMS) system which delivers short text messages to devices receiving pager communication.

Cellular/pager network 115 is coupled to WAN/LAN through gateway 120. Gateway 120 routes messages between cellular/pager network 115 and WAN/LAN 125. For example, a computer user may send an email that is addressed to a pager. Gateway 120 provides a means for transporting the email from WAN/LAN 125 to cellular/pager network 115. Conversely, a user with a device connected to a cellular network may be browsing the Web. Gateway 120 allows hyperlink text protocol (HTTP) messages to be transferred between WAN/LAN 125 and cellular/pager network 115.

Typically, WAN/LAN 125 transmits information between computing devices. One example of a WAN is the Internet which connects millions of computers over a host of gateways, routers, switches, hubs, and the like. An example of a LAN is a network used to connect computers in a single office. A WAN may connect multiple LANs.

Illustrative Message Routing System

Figure 2:
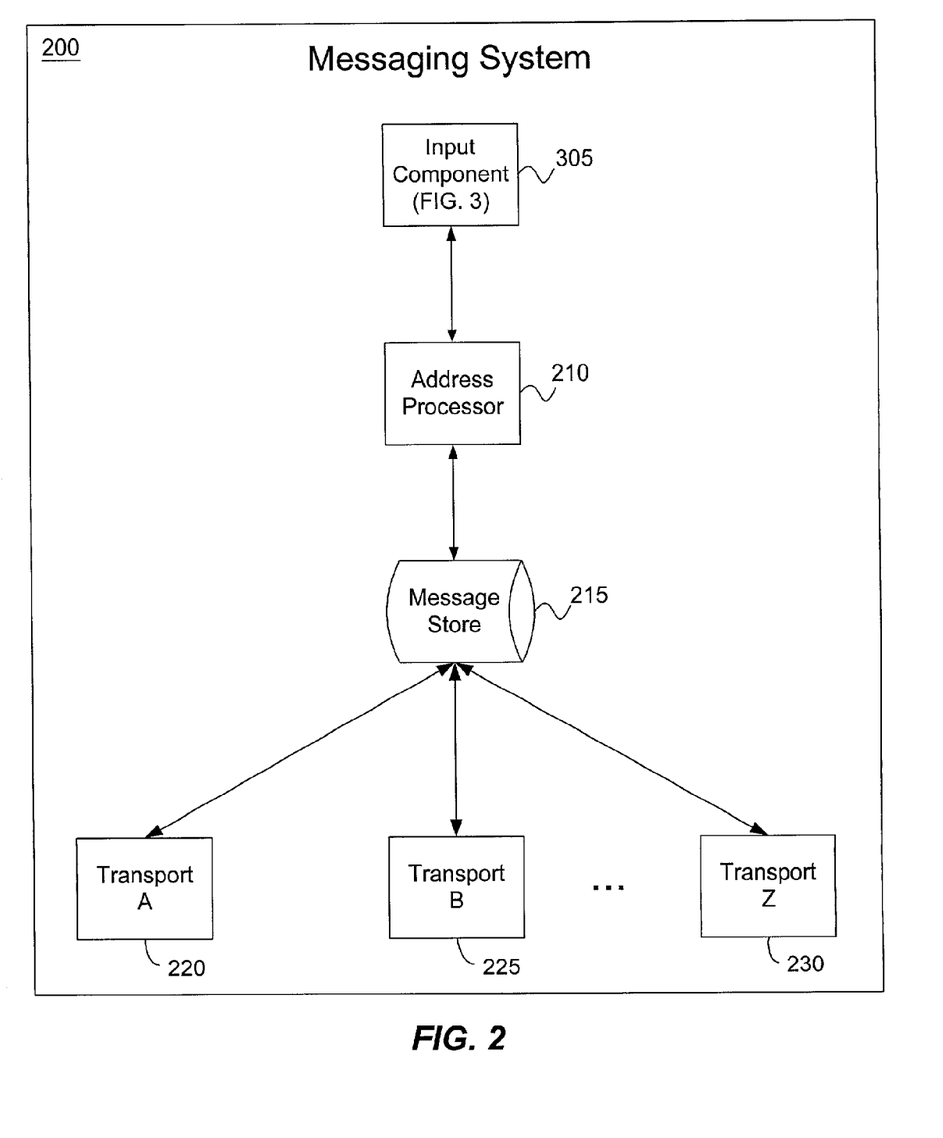
FIG. 2 is a functional block diagram illustrating a messaging system adapted to accept inputted addresses and route them to an appropriate transport.

FIG. 2 is a functional block diagram illustrating a messaging system adapted to accept inputted addresses and route them to an appropriate transport, according to one embodiment of the invention. Messaging system 200 includes input component 305, address processor 210, message store 215, and transports 220, 225, and 230. Although only three transports are shown, it will be understood that more transports could be added or transports could be removed without departing from the spirit and scope of the invention.

Figure 3:
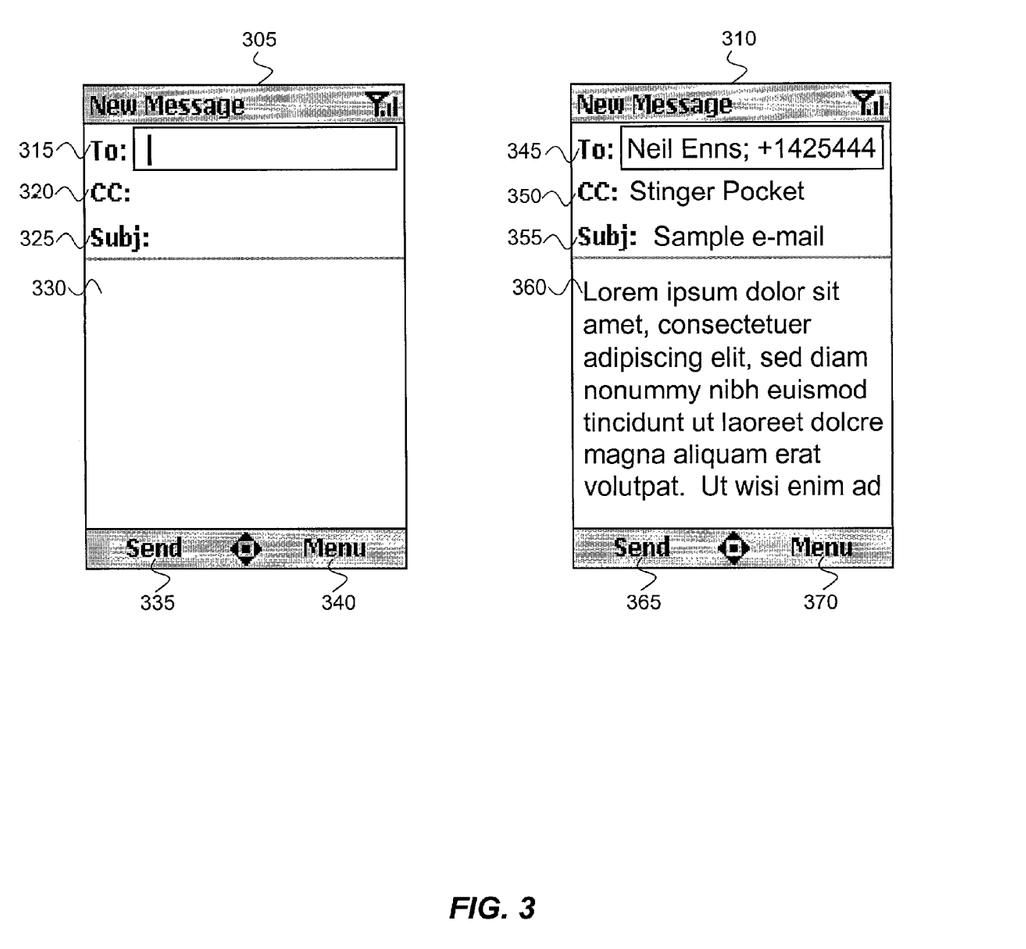
FIG. 3 shows two input components, one blank and one filled in, for sending a message to one or more recipients.

Input component 305 is described in more detail in conjunction with FIG. 3. Briefly, input component 305 receives a message and one or more addresses indicating where the message should be delivered. After receiving the message, input component 305 receives user input indicating that the message should be sent.

Address processor 210 processes the addresses received by input component 305 to determine which transports should be used to deliver the message.

For example, an address may include only digits, such as 12063426253. Such an address may be interpreted as a pager number indicating that the message associated with the address should be delivered over a pager network. Alternatively, an address may include digits and dashes, such as 1-206-342-6253, parenthesis, spaces, digits, and dashes, such as (206) 342-6253, periods, such as 1.206.342.6253, a plus sign and digits, such as +12063426253, etc. Such addresses may also be interpreted as pager numbers indicating that the message associated with the address should be delivered over a pager network. The address may contain a number, which, after searching a database, address processor 210 determines to be a number associated with a fax machine indicating that the message associated with the address should be delivered as a fax message over a cellular network. The address may contain an '@' symbol, such as JaneDoe@microsoft.com, and be interpreted as an email indicating that the message should be delivered over a WAN/LAN.

Address processor 210 may be configured to search for various patterns in the address and to select a default format when address processor 210 cannot recognize the pattern. For example, an address may include digits and letters, such as MailAddress123. Address processor 210 may be configured to mark such messages for delivery using a default transport protocol, such as the simple mail transport protocol (SMTP) for delivery over the Internet. After address processor 210 determines which transport should deliver the message to the address, address processor 210 stores the message in message store 215, may set a flag indicating that a particular transport protocol has at least one recipient to deliver the message to, and then may add the recipient to a list of recipients to which the transport should deliver the message. When a transport, such as transport 220, requests a recipient to send the message to, message store 215 may deliver the next recipient on the list associated with the requesting transport. After all the recipients on the list associated with the transport have been requested, when the transport, such as transport 220, requests another recipient to send the message to, message store 215 may indicate that no further recipients for messages to be delivered by the transport exist.

Input component 305 may receive multiple addresses for one message. Address processor 210 continues determining which transport protocol should deliver the message to each of the addresses until all addresses have been processed. As it determines which transport should deliver the message to the recipient, address processor 210 continues to set a flag and add the recipient to a list to be delivered by the determined transport. After all addresses have been processed, address processor 210 notifies transports 220, 225, and 230 that the message is ready for delivery.

When a transport, such as transport 220, is notified that a message is ready for delivery, it first determines whether the message should be delivered using the transport. Typically, this is done by retrieving from message store 215, a flag previously set by address processor 210. Using the flag, the transport determines whether it should deliver the message to any recipients. When the transport determines that it should deliver the message to at least one recipient, it begins requesting recipients to deliver the message to. After each message is sent, the transport requests another recipient to send the message to until all recipients associated with the transport have been requested.

After the transport has requested and sent to all recipients associated with the transport, the transport requests that the flag indicating that the transport has recipients to deliver to be cleared and determines if it is the last transport sending the message. It may do this by checking if flags associated with other transports are still set. If no other flags are set, the transport may move the message to another folder, such as a sent items or a deleted items folder, or take other appropriate action.

FIG. 3 shows two input components, one blank and one filled in, for sending a message to one or more recipients, according to one embodiment of the invention. Input component 305 includes uncompleted To field 315, carbon copy (CC) field 320, subject field 325, and message field 330. In addition, input component 305 includes send option 335 and menu option 340. Completed form 310 is similar to input component 305, except that the To field, CC field, subject field, and message field have been provided with input. It will be recognized that other fields or options could be included without departing from the spirit and scope of the invention.

To fields 315 and 345 receive addresses of recipients. The address may be literal, as in JaneDoe@microsoft.com, or it may proxy for such an addresses, such as "Neil Enns." A proxy for an address occurs when, for example, a user selects a name from a contact list. Rather than displaying the literal address, i.e. NeilEnns@microsoft.com, the form may display the name of the person the message is directed at while internally indicating (and not displaying) that the message should be sent to NeilEnns@microsoft.com or pager 14253323322 as the case may be. For example, when selecting a recipient from a contact list, a user may search for the contact and, after finding it, select an email address or pager number listed with the contact. With either selection, a name, such as Neil Enns, appears in To field 345, while internally, the recipient is associated with the complete literal address.

CC fields 320 and 350 operate similarly to To fields 315 and 345. Specifically, a user may enter either a literal address, such as JaneDoe@microsoft.com or select an address from a contact list. Then, either the literal address, or a proxy for the address, is displayed.

Subject fields 325 and 355 may contain any text that the user feels appropriate. Typically, a user enters the subject of the message, but the user may enter other information such as "Urgent!", "Call me", etc.

Message fields 330 and 360 typically contain the main body of the text the user desires to send to the recipients. When a user desires to send, in addition to text, non-textual information, such as a picture (not shown), the user may attach the information to the message. Such messages may be encoded using multi-part MIME (Multipurpose Internet Mail Extensions) or other encoding techniques.

Send options 335 and 365 allow the user to send a message. Typically, a user clicks or selects send option 365 after the user has completed filling in the fields on the form. For example, after entering the information on input component 310, the user sends the message using send option 365.

Menu options 340 and 370 may be used to bring up a menu of other functions, such as to enter contacts, select other features, or exit input component 310. For example, using menu 370, the user may retrieve a list of contacts, select to send the message to Neil Enns' pager number, and/or specify options such as urgent delivery, etc. Such an action would then typically cause Neil Enns to be listed in To field 345.

Figure 4:
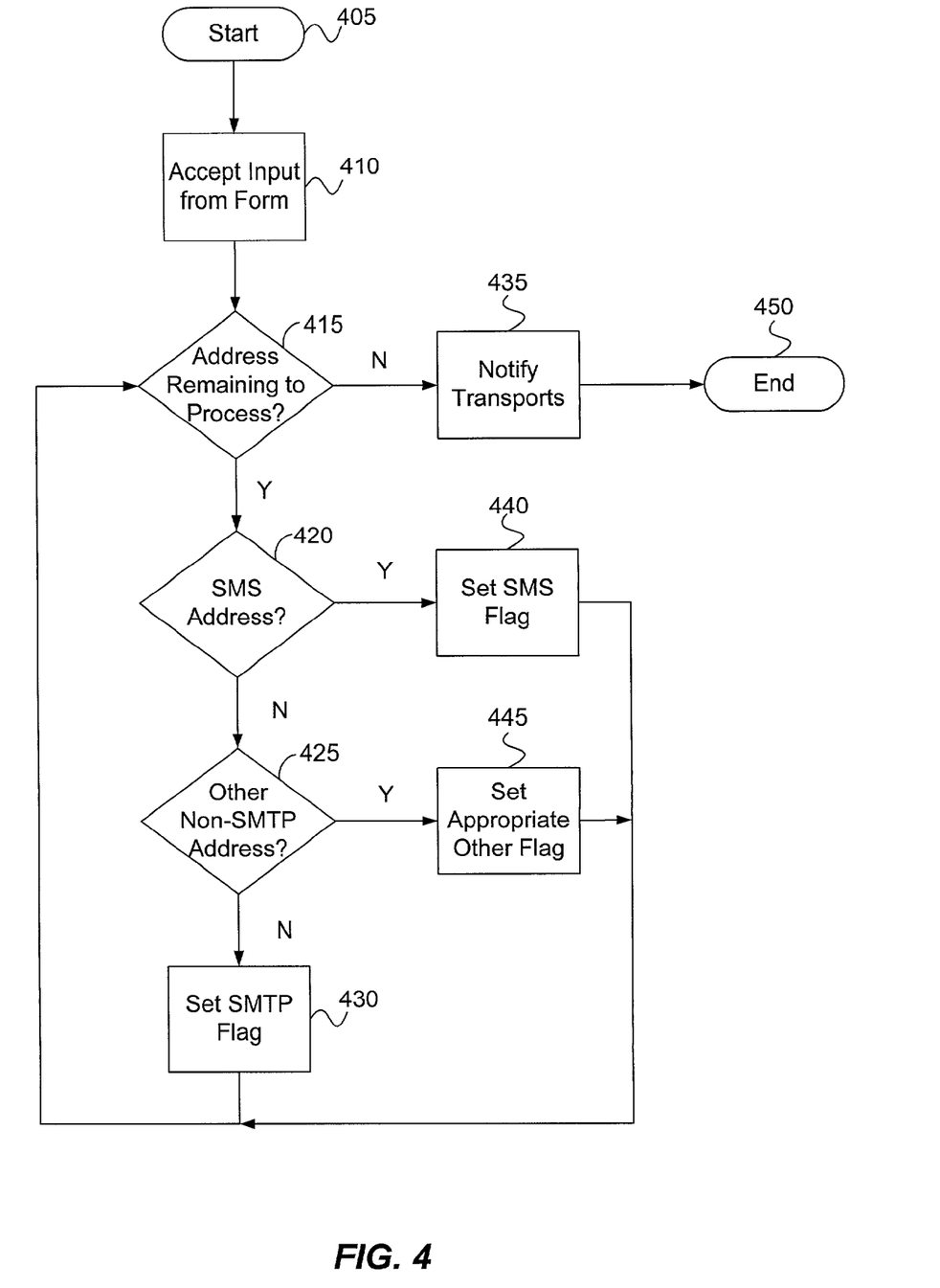
FIG. 4 is a logical flow diagram illustrating a process for determining and flagging which transports to use when sending a message to one or more recipients.

FIG. 4 is a logical flow diagram illustrating a process for determining and flagging which transports to use when sending a message to one or more recipients. The process begins at block 405 when a user opens a message form, such as input component 305 shown in FIG. 3.

At block 410, the user enters information into the form. For example, referring to FIG. 3, the user enters recipients in To field 315, CC recipients in CC field 320, a subject line in subject field 325, and a message in message field 330. A completed message may look like the one partially shown in input component 310. When the user is finished composing the message, the user uses send option 365 to indicate that the message should be sent.

At block 415, a loop is entered which examines each address specified to determine which transport should be used to send the message to the recipient. As long as an address remains to be processed, processing branches through the yes branch to block 420. When all addresses are processed, processing branches through the no branch to block 435. For example, referring to FIG. 3, three addresses are shown. More addresses may be contained in input component 310. Addresses both in To field 345 and CC field 350 are included when determining if more addresses remain to be processed.

At block 420, a determination is made as to whether the address is a short message service (SMS) address. An SMS address is typically used to indicate that the message should be delivered over a pager or cellular network. As indicated with reference to address processor 210, many different types of numerical configurations, including +12063426253, 1-206-342-6253, (206) 342-6253, 1.206.342.6253, etc. may be used to indicate an SMS address. Additionally, an SMS address may be represented explicitly (although not seen on input component 310) by the user specifying an SMS address from a contact list. When the address is not an SMS address, processing follows the yes branch to block 440. When the address is an SMS address, processing follows the no branch to block 425. For example, while processing "Neil Enns" in To field 345 of FIG. 3, the no branch is followed to block 440 because "Neil Enns" was explicitly chosen from the contacts as an email address.

At block 425, a determination is made as to whether the message should be delivered by some other supported transport. For example, the address may indicate that the message should be delivered over a cellular network to a fax machine. If delivering messages to fax machine recipients is supported, the yes branch is followed to an appropriate flagging block, such as block 445; otherwise, the no branch is followed to block 430. For example, when evaluating the address JaneDoe@microsoft.com, the no branch is followed to block 430. It will be recognized that block 425 may be expanded to included tests for various types of addresses such as fax, X.400, etc., without departing from the spirit and scope of the invention.

At block 430, a flag is set indicating that a message is addressed to an SMTP address or that an unknown address type was specified. In addition, the address may also be placed in an SMTP list such that when an SMTP transport asks for the next address to deliver the message to, the address may be quickly retrieved and sent to the SMTP transport. For example, referring to FIG. 2, address processor 210 determines that the message is addressed to an SMTP recipient (or that the message is addressed to be delivered through an unknown transport) and sets a flag indicating that the SMTP transport has a message to deliver. In addition, address processor 210 may store a list of addresses in message store 215 that the SMTP transport should deliver to.

At block 440, a flag is set indicating that a message is addressed to an SMS address. In addition, the address may also be placed in an SMS list such that when an SMS transport asks for the next address to deliver the message to, the address may be quickly retrieved and sent to the SMS transport. For example, referring to FIG. 2, address processor 210 determines that the message is addressed to an SMS recipient and sets a flag indicating that the SMS transport has a message to deliver. In addition, address processor 210 may store a list of addresses in message store 215 that the SMS transport should deliver.

At block 445, a flag is set indicating that a message is addressed to a non-SMTP address. In addition, the address may also be placed in a list such that when the appropriate transport asks for the next address to deliver the message to, the address may be quickly retrieved and sent to the requesting transport. For example, referring to FIG. 2, address processor 210 determines that the message is addressed to a fax recipient and sets a flag indicating that the fax transport has a message to deliver. In addition, address processor 210 may store a list of addresses in message store 215 that the fax transport should deliver.

At block 435, addresses have been processed and flags set indicating which transports have messages to deliver. At this point, notifications are sent to the transports to indicate that a new message is ready for delivery. In one embodiment of the invention, notifications are sent to all transports that a message is ready to be delivered. Each transport then queries the message store to determine if the message needs to be delivered by the particular transport. In another embodiment of the invention, notifications are sent only to those transports for which flags have been set indicating that a message has one or more recipients serviced by the transport.

At block 450, processing ends. Next, each transport begins processing to determine whether it has messages to send as described in conjunction with FIG. 5.

Figure 5:
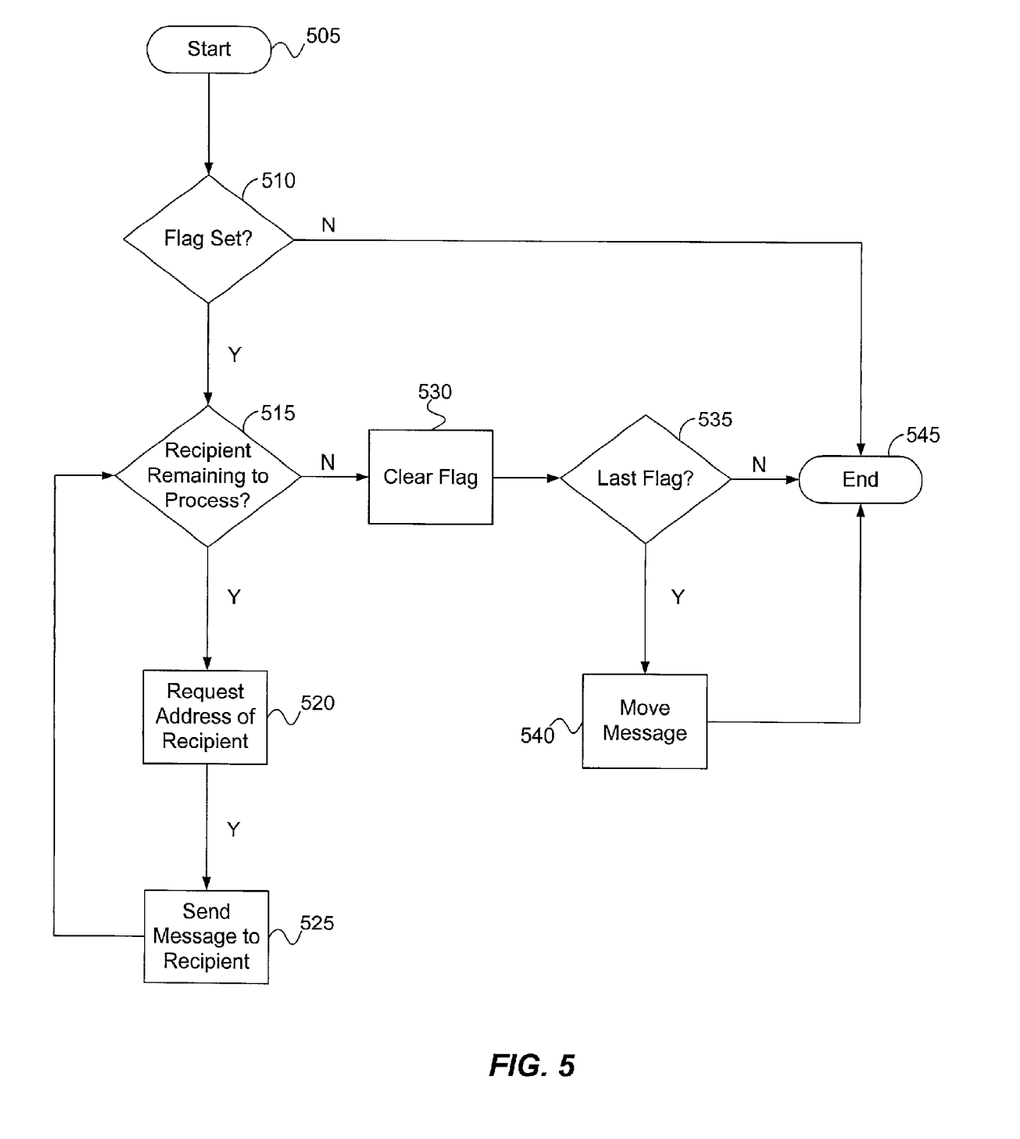
FIG. 5 is a logical flow diagram illustrating a process for determining if a transport has one or more recipients to deliver a message to and sending the message if so determined.

FIG. 5 is a logical flow diagram illustrating a process for determining if a transport has one or more recipients to deliver a message to and sending the message if so determined, according to one embodiment of the invention. The process starts at block 505 after notification has been sent that a message is available for delivery. It should be noted that the process illustrated may be performed by each transport in the system, either simultaneously or at random intervals.

At block 510, the transport determines if a flag indicating that there are any messages pending that the transport should deliver. This may be accomplished by retrieving a register previously set by an address processor, such as address processor 210 of FIG. 2, with each bit corresponding to a separate transport. Alternatively, a message store, such as message store 215 of FIG. 2, could be queried to determine if any messages are pending for the transport to deliver. If no messages are pending, processing follows the no branch to block 545 and ends. If messages are pending, processing follows the yes branch to block 515. For example, referring to FIG. 2, transport 220, which may be the transport for SMS, determines that a flag has been set indicating that it has messages to deliver.

At block 515, the transport enters a loop in which it queries the message store to determine if any recipients remain to deliver the message to. When all messages have been delivered, the no branch is followed to block 530. When more messages are available, the yes branch is followed to block 520.

At block 520, the transport requests the address of the recipient to deliver the message to. Typically, the transport does so by querying the message store for the next recipient. For example, referring to FIG. 2, transport 220 requests the next recipient and receives +14254444233.

At block 525, the transport sends the message to the recipient associated with the address previously requested. The transport may send the message over a cellular/pager network or a WAN/LAN, depending on the nature of the transport. For example, referring to FIG. 2, if transport 220 is an SMS transport, it may send the message to a pager with telephone number 1-425-444-4233. The message may be as illustrated in FIG. 3.

At block 530, the transport requests that the flag indicating that it has messages to deliver be cleared. Block 530 is entered after all recipients associated with the transport have been processed. The transport may request that the flag be cleared in a register or memory, by locking the register or memory and clearing the flag in the register or memory. For example, referring to FIG. 2, transport 220 sends the message to the last SMS recipient, locks memory, and clears the flag.

At block 535, the transport determines if it just cleared the last flag. One of the transports delivering messages will be the last to send the message to a recipient. When the last transport has delivered the message, it may be desired to perform some post-processing on the message, such as to move the message to another folder, such as a sent items or a deleted items folder, or take other appropriate action. When the flags associated with the transports are stored in a register, one way of determining if all flags have been cleared is to compare the register to zero. If the register equals zero, no more flags remain and hence all transports have delivered (or attempted to deliver) messages to all of their associated recipients. When the transport determines that it just cleared the last flag, the yes branch is followed to block 540; otherwise, the no branch is followed to block 545 and processing ends.

At block 540, some post-processing may be performed on the message. For instance, if the message has been completely sent, it may be desirable to move the message from an out box folder to some other folder, such as a sent items folder or the like. For example, referring to FIG. 2, transport 220 determines that it just cleared the last flag and requests that the message be moved to a sent items folder. Such status is updated in message store 215 appropriately.

At block 545, processing ends. At this point a message has been received by an input component, such as input component 305, flags associated with transports have been set to indicate which transports should send the message, the transport of FIG. 5 has sent the message to any recipients that were listed for that transport, has cleared the flag, and performed any post-processing. When each transport in the system has executed the process shown in FIG. 5, the message has been moved, deleted, or otherwise appropriately handled and flags indicate that sending has been accomplished.

Illustrative Mobile Computing Device

FIG. 6 is a functional block diagram illustrating functional components of a mobile computing device 600. The mobile computing device 600 has a processor 660, a memory 662, a display 628, and a keypad 632. The memory 662 generally includes both volatile memory (e.g., RAM) and non-volatile memory (e.g., ROM, Flash Memory, or the like). The mobile computing device 600 includes an operating system 664, such as the Windows CE operating system from Microsoft Corporation or other operating system, which is resident in the memory 662 and executes on the processor 660. The keypad 632 may be a push button numeric dialing pad (such as on a typical telephone), a multi-key keyboard (such as a conventional keyboard). The display 628 may be a liquid crystal display, or any other type of display commonly used in mobile computing devices. The display 628 may be touch sensitive, and would then also act as an input device.

One or more application programs 667 are loaded into memory 662 and run on the operating system 664. Examples of application programs include phone dialer programs, email programs, scheduling programs, PIM (personal information management) programs, word processing programs, spreadsheet programs, Internet browser programs, and so forth. The mobile computing device 600 also includes nonvolatile storage 668 within the memory 662. The nonvolatile storage 668 may be used to store persistent information which should not be lost if the mobile computing device 600 is powered down. The applications 667 may use and store information in the storage 668, such as e-mail or other messages used by an e-mail application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage 668 synchronized with corresponding information stored at the host computer.

The mobile computing device 600 has a power supply 670, which may be implemented as one or more batteries. The power supply 670 might further include an external power source, such as an AC adapter or a powered docking cradle, that supplements or recharges the batteries.

The mobile computing device 600 is also shown with two types of external notification mechanisms: an LED 640 and an audio interface 674. These devices may be directly coupled to the power supply 670 so that when activated, they remain on for a duration dictated by the notification mechanism even though the processor 660 and other components might shut down to conserve battery power. The LED 640 may be programmed to remain on indefinitely until the user takes action to indicate the powered-on status of the device. The audio interface 674 is used to provide audible signals to and receive audible signals from the user. For example, the audio interface 674 may be coupled to a speaker for providing audible output and to a microphone for receiving audible input, such as to facilitate a telephone conversation.

The mobile computing device 600 also includes a radio 672 that performs the function of transmitting and receiving radio frequency communications. The radio 672 facilitates wireless connectivity between the mobile computing device 600 and the outside world, via a communications carrier or service provider. Transmissions to and from the radio 672 are conducted under control of the operating system 664. In other words, communications received by the radio interface layer 672 may be disseminated to application programs 667 via the operating system 664, and vice versa.

Illustrative Computing Device

With reference to FIG. 7 an exemplary system for implementing the invention includes a computing device, such as computing device 700. In a very basic configuration, computing device 700 typically includes at least one processing unit 702 and system memory 704. Processing unit 702 includes existing physical processors, those in design, multiple processors acting together, virtual processors, and any other device or software program capable of interpreting binary executable instructions. Depending on the exact configuration and type of computing device, system memory 704 may be volatile (such as RAM), non-volatile (such as ROM, flash memory, etc.) or some combination of the two. System memory 704 typically includes an operating system 705, one or more program modules 706, and may include program data 707. This basic configuration is illustrated in FIG. 7 by those components within dashed line 708.

Computing device 700 may also have additional features or functionality. For example, computing device 700 may also include additional data storage devices (removable and/or non-removable) such as, for example, magnetic disks, optical disks, or tape. Such additional storage is illustrated in FIG. 7 by removable storage 709 and non-removable storage 710. Computer storage media may include volatile and nonvolatile, removable and non-removable media implemented in any method or technology for storage of information, such as computer readable instructions, data structures, program modules or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included. All these devices are known in the art and need not be discussed at length here.

Computing device 700 may also contain communications connection(s) 716 that allow the device to communicate with other computing devices 718, such as over a network. Communications connection(s) 716 is an example of communication media. Communication media typically embodies computer readable instructions, data structures, program modules or other data in a modulated data signal such as a carrier wave or other transport and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The various embodiments of the invention are implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit and scope of the present invention as recited within the claims attached hereto.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for sending a message using different transports, comprising:
   receiving data in a destination address field of the message including recipient addresses that indicate different address types;
   setting flags based on the address types in the data, wherein the flags indicate the transports to deliver the message in accordance with the recipient addresses;
   determining the transports to deliver the message based on the set flags; and
   sending the message using the transports based on the set flags.

2. The method of claim 1, wherein determining the transports includes examining the addresses for pre-defined patterns.

3. The method of claim 2, wherein one of the addresses is determined to be a wireless address if the address contains numbers.

4. The method of claim 2, wherein the one of the transports is determined to be a default transport if one of the addresses contains no identifiable pre-defined pattern.

5. The method of claim 1, further comprising the data associated with the addresses that explicitly indicates that a particular transport should deliver the message to the addresses.

6. The method of claim 5, wherein the data is associated with the addresses in response to a user selecting the addresses from a list.

7. The method of claim 1, further comprising each of the transports performing the actions of:
   determining if one of the flags indicates the transport should deliver the message; and
   if so, delivering the message.

8. The method of claim 7, further comprising each of the transports performing the actions of:
   determining if the transport is a last transport to send the message; and
   if so, further processing the message.

9. The method of claim 8, wherein further processing the message includes moving the message to a destination folder.

10. The method of claim 9, wherein the destination folder is a sent items folder.

11. The method of claim 9, wherein the destination folder is a deleted items folder.

12. A system for sending a message using different transports, comprising:
    an input component that receives data in a destination address field of the message including recipient addresses that indicate different address types to deliver the message;
    an address processor that uses the characters of the different addresses to determine an address types, wherein the address processor indicates the address types by associating a flags with the message, and wherein the flags indicate candidate transports to deliver the message; and
    the transports use the flags to determine if they should deliver the message, and if so, the transports send the message based on the flags.

13. The system of claim 12, wherein the input component receives the different address types by performing the actions of:
    providing a list of addresses;
    receiving a selected addresses; and
    providing the data linked to the addresses, the data indicating selected transports to deliver the message.

14. The system of claim 12, wherein the address processor determines which candidate transports should deliver the message by searching for patterns in the data associated with the addresses.

15. The system of claim 14, wherein if the address processor does not find a recognized pattern in one of the addresses, it sets one of the flags indicating that a default transport should deliver the message.

16. The system of claim 12, wherein if one of the transports determines that it is the last to send the message, the transport moves the message to a sent box.

17. A computer-readable media including computer-readable instructions for sending a message using different transports, the computer-readable media comprising:
    means for receiving data in a destination address field of the message including recipient addresses that identify different address types; and
    means for setting flags based on the address types in the data, wherein the flags indicate the transports to deliver the message in accordance with the recipient addresses;
    means for determining the transports to deliver the message based on the set flags; and
    means for delivering the message with the determined transports to the addresses.

18. The computer readable media of claim 17, further comprising:
    each of the transports includes means for:
        determining if one of the flags indicates the transport should deliver the message; and
        if so, delivering the message.

* * * * *

UNITED STATES PATENT AND TRADEMARK OFFICE
CERTIFICATE OF CORRECTION

PATENT NO. : 7,013,350 B2 Page 1 of 1
APPLICATION NO. : 09/788225
DATED : March 14, 2006
INVENTOR(S) : Neil R. N. Enns et al.

It is certified that error appears in the above-identified patent and that said Letters Patent is hereby corrected as shown below:

On the title page, item (56), under "U.S. Patent Documents", in column 1, line 4, delete "O'Neill" and insert -- O'Neil et al. --, therefor.

On the title page, item (56), under "U.S. Patent Documents", in column 1, line 5, delete "6,370,566 B1" and insert -- 6,370,566 B2 --, therefor.

In column 9, line 33, delete "nonvolatile" and insert -- non-volatile --, therefor.

In column 12, line 15, in Claim 12, after "determine" delete "an".

In column 12, line 17, in Claim 12, after "associating" delete "a".

In column 12, line 27, in Claim 13, after "receiving" delete "a".

Signed and Sealed this

Ninth Day of March, 2010

David J. Kappos
*Director of the United States Patent and Trademark Office*